(12) United States Patent
Agata et al.

(10) Patent No.: US 10,259,310 B2
(45) Date of Patent: Apr. 16, 2019

(54) VEHICLE DRIVE DEVICE

(71) Applicant: AISIN AW CO., LTD., Anjo-shi, Aichi-ken (JP)

(72) Inventors: Hiromichi Agata, Nishio (JP);
Tatsuyuki Uechi, Toyoake (JP);
Tomoyuki Suzuki, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 216 days.

(21) Appl. No.: 15/518,661

(22) PCT Filed: Dec. 8, 2015

(86) PCT No.: PCT/JP2015/084435
§ 371 (c)(1),
(2) Date: Apr. 12, 2017

(87) PCT Pub. No.: WO2016/098646
PCT Pub. Date: Jun. 23, 2016

(65) Prior Publication Data
US 2017/0232831 A1 Aug. 17, 2017

(30) Foreign Application Priority Data
Dec. 15, 2014 (JP) ................................. 2014-253041

(51) Int. Cl.
*H02K 9/00* (2006.01)
*B60K 6/405* (2007.10)
(Continued)

(52) U.S. Cl.
CPC ............... *B60K 6/405* (2013.01); *B60K 6/26* (2013.01); *B60K 6/48* (2013.01); *B60K 6/54* (2013.01);
(Continued)

(58) Field of Classification Search
CPC . H02K 9/19; H02K 11/33; H02K 5/20; H02K 5/225; B60K 6/405; B60K 6/48;
(Continued)

(56) References Cited

U.S. PATENT DOCUMENTS 5,491,370 A * 2/1996 Schneider .............. H02K 7/006
310/54
8,875,825 B2 * 11/2014 Asakura ................. B60K 6/405
180/68.4
(Continued)

FOREIGN PATENT DOCUMENTS

| JP | 2003-199363 A | 7/2003 |
| JP | 2005-020881 A | 1/2005 |
| JP | 2013-115903 A | 6/2013 |

OTHER PUBLICATIONS

Mar. 1, 2016 Search Report issued in International Patent Application No. PCT/JP2015/084435.

*Primary Examiner* — Thanh Lam
(74) *Attorney, Agent, or Firm* — Oliff PLC

(57) ABSTRACT

A vehicle drive device that includes a body case that accommodates at least the rotary electric machine; an inverter case joined to the body case; and an inverter case cover joined to the inverter case; wherein an inverter housing that accommodates the inverter device is formed in a space enclosed by at least the inverter case; wherein a connection terminal electrically connecting the rotary electric machine and the inverter device is disposed in the inverter housing; wherein the case outer wall is formed by a first outer wall, a second outer wall, and the inverter case cover, the first outer wall being an outer wall of the body case, the second outer wall being an outer wall of the inverter case; and wherein a supply port and a discharge port
(Continued)

for liquid refrigerant for cooling the inverter device are formed on the second outer wall.

20 Claims, 7 Drawing Sheets

(51) Int. Cl.
- B60K 6/48 (2007.10)
- B60K 6/54 (2007.10)
- H02K 9/19 (2006.01)
- H02K 11/33 (2016.01)
- B60K 6/26 (2007.10)
- B60L 11/08 (2006.01)
- B60L 11/14 (2006.01)
- B60L 11/18 (2006.01)
- H02K 5/20 (2006.01)
- H02K 5/22 (2006.01)
- H02K 7/00 (2006.01)
- H02M 7/5387 (2007.01)
- H02P 27/06 (2006.01)

(52) U.S. Cl.
CPC ............... *B60L 11/08* (2013.01); *B60L 11/14* (2013.01); *B60L 11/1803* (2013.01); *H02K 5/20* (2013.01); *H02K 5/225* (2013.01); *H02K 7/006* (2013.01); *H02K 9/19* (2013.01); *H02K 11/33* (2016.01); *B60K 2006/4825* (2013.01); *B60L 2210/30* (2013.01); *B60L 2210/40* (2013.01); *B60Y 2200/92* (2013.01); *B60Y 2306/05* (2013.01); *B60Y 2400/61* (2013.01); *H02M 7/5387* (2013.01); *H02P 27/06* (2013.01); *Y10S 903/906* (2013.01); *Y10S 903/952* (2013.01)

(58) Field of Classification Search
CPC ........ B60K 6/26; B60L 11/1803; B60L 11/08; B60L 11/14
USPC .............................. 310/52–59, 68 D, 71, 89
See application file for complete search history.

(56) References Cited

U.S. PATENT DOCUMENTS

| | | | |
|---|---|---|---|
| 2005/0253465 A1* | 11/2005 | Takenaka | H02K 5/20 310/52 |
| 2010/0072865 A1* | 3/2010 | Endo | B60K 6/26 310/68 D |
| 2012/0313465 A1* | 12/2012 | Prix | H02K 5/20 310/54 |
| 2014/0202279 A1 | 7/2014 | Triantos et al. | |
| 2016/0248302 A1* | 8/2016 | Nagao | H02K 9/19 |

* cited by examiner

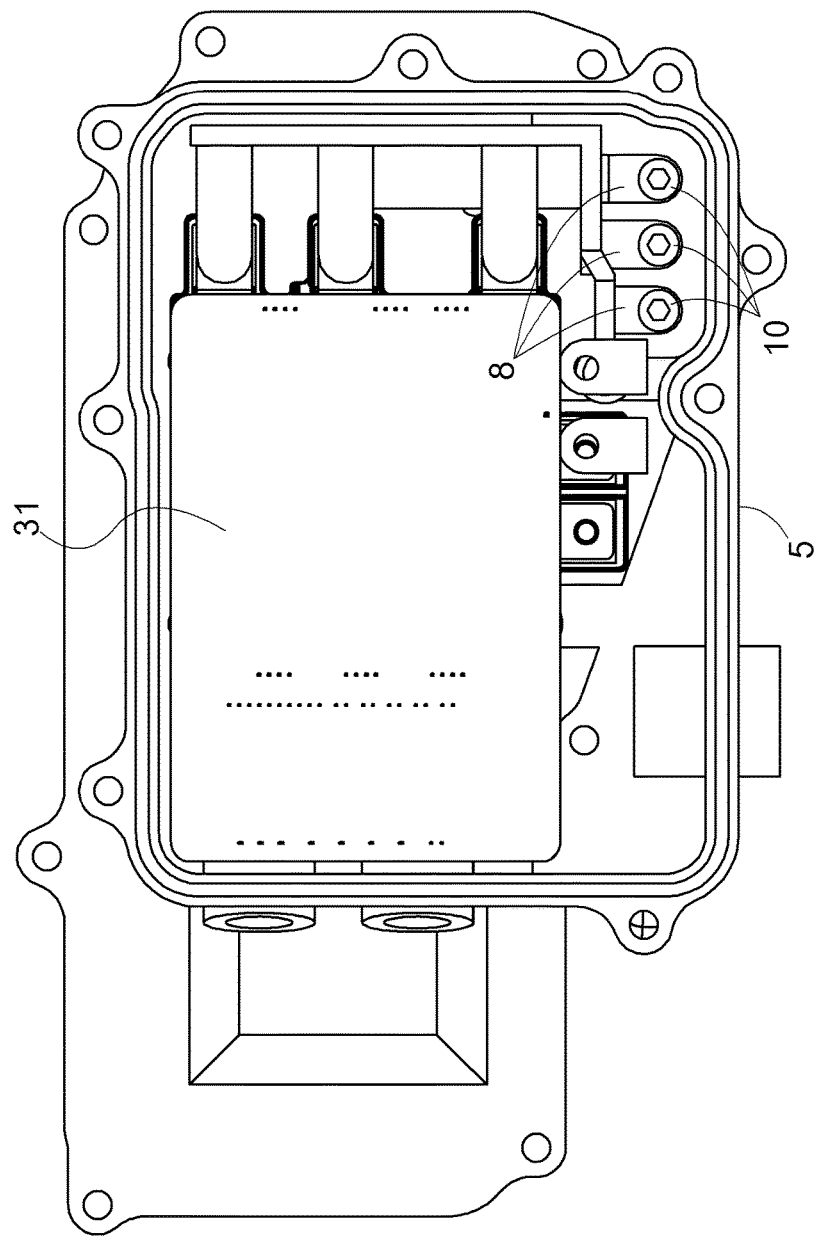

VEHICLE DRIVE DEVICE

BACKGROUND

The present disclosure relates to a vehicle drive device provided with a rotary electric machine that serves as a drive power source for wheels and an inverter device that controls the rotary electric machine.

United States Patent Application Publication No. 2014/0202279 discloses a transmission device (a transmission 10) suitable for hybrid vehicles (for example, FIGS. 1 and 2). This transmission device includes rotary electric machines (motor/generators 56 and 58), and an inverter (a power inverter module 30) that drives the rotary electric machines. The rotary electric machines and the inverter are accommodated in a housing space defined by a casing (12) and a lid (36) attached to the casing. Openings (a first opening 52 and a second opening 84) are formed on the lid. Connection terminals (a first junction 38 and a connection plug 88) electrically connected to the inverter extend outward from these openings. These connection terminals are connected to other devices disposed outside the transmission device, such as a power supply device and a control device, through wiring members (a first cable harness 50 and a wire harness 86). A flow path that supplies and discharges refrigerant for cooling the inverter passes through a platform (26) of the casing to enter the housing space, and is connected to the inverter inside the housing space (see, for example, FIG. 4).

In the transmission device of United States Patent Application Publication No. 2014/0202279, since the refrigerant flow path is connected to the inverter disposed in the casing through the wall of the casing, there are many locations to be sealed. This may result in a complicated structure and higher manufacturing costs.

SUMMARY

An exemplary aspect of the disclosure achieves a structure that reduces the number of locations to be sealed in a vehicle drive device provided with a rotary electric machine that serves as a drive power source for wheels and an inverter device that controls the rotary electric machine.

In view of the above, according to an exemplary aspect, a vehicle drive device contains a rotary electric machine that serves as a drive power source for wheels and an inverter device that controls the rotary electric machine in a space enclosed by a case outer wall, the vehicle drive device including: a body case that accommodates at least the rotary electric machine; an inverter case joined to the body case; and an inverter case cover joined to the inverter case; wherein an inverter housing that accommodates the inverter device is formed in a space enclosed by at least the inverter case; wherein a connection terminal electrically connecting the rotary electric machine and the inverter device is disposed in the inverter housing; wherein the case outer wall is formed by a first outer wall, a second outer wall, and the inverter case cover, the first outer wall being an outer wall of the body case, the second outer wall being an outer wall of the inverter case; and wherein a supply port and a discharge port for liquid refrigerant for cooling the inverter device are formed on the second outer wall.

According to the present configuration, the supply port and the discharge port for liquid refrigerant are provided in the second outer wall. In other words, the supply port and the discharge port, are formed directly on the inverter case that accommodates the inverter device to be cooled. Accordingly locations that need to be sealed are limited. For example, according to United States Patent Application Publication No. 2014/0202279, a supply port and a discharge port pass through the platform (26) of the casing to enter the housing space, and are connected to the inverter device inside the housing space. Accordingly, since the boundary between the outside of the casing and the housing space needs to be sealed, there are more sealed locations as compared to the present configuration. Thus, according to the present configuration, it is possible to achieve, in a vehicle drive device provided with a rotary electric machine that serves as a drive power source for wheels and an inverter device that controls the rotary electric machine, a structure that allows easy maintenance of the inverter device and reduces the number of locations to be sealed.

BRIEF DESCRIPTION OF THE DRAWINGS

Other features and advantages of the vehicle drive device will become apparent from the following description of the embodiments with reference to the accompanying drawings.

FIG. 7 is a schematic top plan view illustrating the vehicle drive device.

DETAILED DESCRIPTION OF EMBODIMENTS

Figure 1:
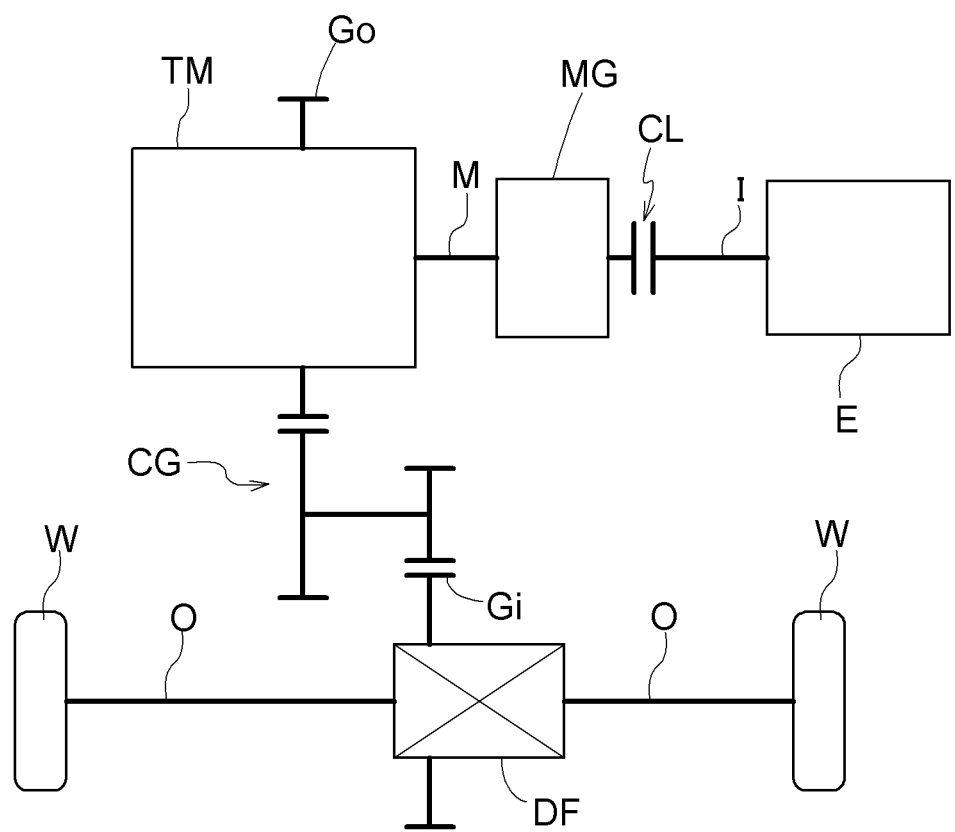
FIG. 1 is a block diagram illustrating the schematic configuration of a vehicle drive device.

An embodiment of a vehicle drive device will be described with reference to the drawings. As illustrated in FIG. 1, the present embodiment describes a vehicle drive device 1 (hybrid vehicle drive device) for a vehicle (hybrid vehicle) that includes both an internal combustion engine E and a rotary electric machines (MG) as drive power sources for the wheels of the vehicle. The vehicle drive device 1 is configured as a hybrid vehicle drive device of a so-called single-motor parallel type. In the following description, terms related to the direction, the location, and so on of each member may allow the differences caused by acceptable manufacturing errors. Furthermore, the direction of each member indicates the direction thereof when the member is mounted in the vehicle drive device 1.

The internal combustion engine E is a heat engine that outputs power by explosive combustion of hydrocarbon-based fuel, such as gasoline, gas oil, ethanol, and natural gas, or hydrogen. The rotary electric machine MG is a rotary electric machine (motor/generator) driven by a multi-phase AC power (three-phase AC power in this example), and can serve as both a motor and a generator. As will be described below with reference to FIG. 2, the rotary electric machine MG performs power running using electric power supplied from a high-voltage DC power supply BH, or supplies (regenerates) electric power generated by the torque of the internal combustion engine E and the inertia force of the vehicle to the high-voltage DC power supply BH. The internal combustion engine E and the rotary electric machine MG, both of which can serve as drive power sources for wheels W, are drivingly coupled via a clutch CL serving as a drive power source coupling device.

Note that the term "drivingly coupled" refers to a state in which two rotary elements are coupled to allow transmission of the drive power. Specifically, the term "drivingly coupled" refers to states including a state in which the two rotary elements are coupled to rotate together, and a state in which the two rotary elements are coupled via one or two or more transmission members to allow transmission of the drive power. Examples of such transmission members include various members that transmit rotation at an equal speed or a changed speed, such as a shaft, a gear mechanism, a belt, and a chain, for example. Examples of such transmission members may further include an engagement device that selectively transmits rotation and drive power, such as a friction engagement device and a meshing type engagement device, for example.

In the present embodiment, the vehicle drive device 1 further includes a transmission device TM, a counter gear mechanism CG, and a differential gear device DF. That is, as illustrated in FIG. 1, the vehicle drive device 1 includes the clutch CL, the rotary electric machine MG, the transmission device TM, the counter gear mechanism CG, and the differential gear device DF (output differential gear device), on a power transmission path connecting the internal combustion engine E and the wheels W (that is, on a power transmission path connecting an input shaft I and output shafts O), in this order from the internal combustion engine E side. In the present embodiment, the devices from the clutch CL to the differential gear device DF are accommodated in a case 2 (drive device case) described below.

As illustrated in FIG. 1, the input shaft I is drivingly coupled to the internal combustion engine E serving as a drive power source of the wheels W together with the rotary electric machine MG. For example, the input shaft I is drivingly coupled to an output shaft (crankshaft or the like) of the internal combustion engine E. The output shaft of the internal combustion engine E and the input shaft I may be drivingly coupled via a damper and so on. The clutch CL serving as a drive power source coupling device selectively drivingly couples the input shaft I (internal combustion engine E) and the rotary electric machine MG. That is, the clutch CL drivingly couples and uncouples the two drive power sources, that is, the internal combustion engine E and the rotary electric machine MG. For example, the clutch CL may be a hydraulically-driven friction engagement device, an electromagnetically-driven friction engagement device, a meshing engagement device, or the like. Furthermore, the clutch CL may be a lock-up clutch of a torque converter, for example.

The rotary electric machine MG is disposed coaxially with the input shaft I. The rotary electric machine MG includes a stator fixed to the case 2, and a rotor rotatably supported radially inward of the stator. The stator includes a stator core and a stator coil wound around the stator core. The rotor includes a rotor core and a permanent magnet disposed in the rotor core. The rotor of the rotary electric machine MG is drivingly coupled to an intermediate shaft M to rotate therewith. The intermediate shaft M serves also as an input shaft (shift input shaft) of the transmission device TM.

The transmission device TM is disposed coaxially with the input shaft I and the rotary electric machine MG. In order to establish a plurality of shift speeds, the transmission device TM may be configured to include a stepped speed change mechanism including a gear mechanism such as a planetary gear mechanism and a plurality of engagement devices (clutch, brake, etc.). Alternatively, the transmission device TM may be one having a speed change mechanism (CVT: Continuously Variable Transmission) that enables continuous speed change by changing the diameter of two pulleys with a belt or chain extending therearound. Alternatively, the transmission device TM may be a gear mechanism with fixed speed ratios. That is, the transmission device TM may be any type of transmission device as long as the transmission device TM transmits rotation of the input shaft to the output shaft at a changed speed and, in the case where the speed ratio is variable, includes a speed change mechanism configured to be capable of changing the speed ratio. Note that the speed ratio refers to the ratio of the rotational speed of the input shaft to the rotational speed of the output shaft (=the rotational speed of the input shaft/the rotational speed of the output shaft) in the case where each shift speed is established in the transmission device TM. The transmission device TM transmits rotation and torque input to the intermediate shaft M to a transmission output gear Go, which is an output member (transmission output member) of the transmission device TM, with the speed changed at a speed ratio at each time point and with torque converted.

The transmission output gear Go is drivingly coupled to the counter gear mechanism CG. The counter gear mechanism CG has a rotation axis generally parallel to the rotation axes of the input shaft I and so on and is disposed on an axis different from those rotation axes. Note that "generally parallel" refers to a parallel state or a substantially parallel state (for example, a state of intersecting at an angle equal to or less than 5°). For example, the counter gear mechanism CG includes two gears formed on a common shaft member. One of the gears meshes with the transmission output gear Go of the transmission device TM. The other one of the gears meshes with a differential input gear Gi of the differential gear device DF.

The differential gear device DF has a rotation axis generally parallel to the rotation axes of the input shaft I and so on and the counter gear mechanism CG, and is disposed on an axis different from those rotation axes. The differential gear device DF is drivingly coupled to the wheels W via the output shafts O serving as output members. The differential gear device DF is configured to include a plurality of bevel gears meshing with each other, and distributes and transmits rotation and torque input to the differential input gear Gi to the two right and left output shafts O (that is, the two right and left wheels W). This allows the vehicle drive device 1 to transmit torque of at least one of the internal combustion engine E and the rotary electric machine MG to the wheels W to drive the vehicle.

Figure 2:
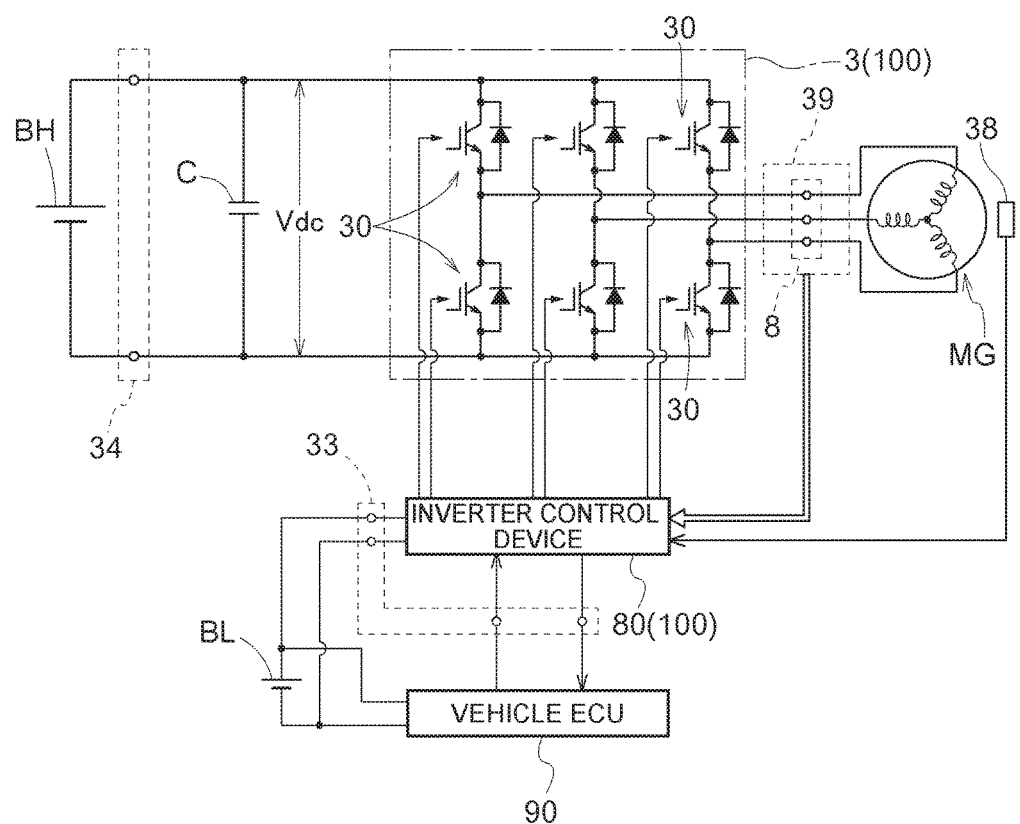
FIG. 2 is a schematic circuit block diagram illustrating an electrical system that drives a rotary electric machine.

As illustrated in FIG. 2, the rotary electric machine MG driven by a multi-phase AC power (three-phase AC power in this example) is electrically connected to the high-voltage DC power supply BH (a battery, a capacitor, or the like) via an inverter 3. The power supply voltage of the high-voltage DC power supply BH is 200 to 400 [V], for example. The high-voltage DC power supply BH is a secondary cell (a battery) such as a nickel hydride battery and a lithium-ion battery, or an electric double-layer capacitor. The high-voltage DC power supply BH can supply electric power to the rotary electric machine MG via the inverter 3, and can store electric power generated by the rotary electric machine MG. A smoothing capacitor (a DC link capacitor C) that smooths the voltage across the positive and negative terminals (DC link voltage Vdc) on the DC side of the inverter 3 is provided between the inverter 3 and the high-voltage DC power supply BH. The DC link capacitor C stabilizes the DC voltage (DC link voltage Vdc) that fluctuates according to the fluctuation of the power consumption of the rotary electric machine MG.

The inverter 3 converts electric power between DC power and AC power. The inverter 3 converts DC power to a multi-phase (three-phase in this example) AC power and supplies the AC power to the rotary electric machine MG. The inverter 3 also converts AC power generated by the rotary electric machine MG to DC power and supplies the DC power to the high-voltage DC power supply BH. The inverter 3 and the rotary electric machine MG is connected via a connection terminal 8. The inverter 3 is configured to include a plurality of switching elements 30. A power semiconductor element such as an IGBT (Insulated Gate Bipolar Transistor), a power MOSFET (Metal Oxide Semiconductor Field Effect Transistor), an SiC-MOSFET (Silicon Carbide-Metal Oxide Semiconductor FET), and an SiC-SIT (SiC-Static Induction Transistor), is preferably used as the switching element 30. As illustrated in FIG. 2, an IGBT is used as the switching element 30 in the present embodiment.

As is well known, the inverter 3 includes a bridge circuit including arms corresponding to the respective phases. That is, as illustrated in FIG. 2, two switching elements 30 are connected in series between the DC positive side and the DC negative side of the inverter 3 to form one arm. In the case of the three-phase AC, such series circuits (arms), each corresponding to one of three lines (three phases), are connected in parallel. That is, the bridge circuit includes series circuits (arms), each corresponding to one of the stator coils of a U-phase, a V-phase, and a W-phase of the rotary electric machine MG. Note that a free wheel diode is connected in parallel to each switching element 30, with the direction from the negative terminal to the positive terminal (the direction from the lower stage to the upper stage) as a forward direction. In the present embodiment, the inverter 3 of three-phase arms configured to include the switching elements 30 and free wheel diodes is modularized into a package as an IPM (Intelligent Power Module) 32 (see FIGS. 5 and 6).

The inverter 3 is controlled by an inverter control device 80. The inverter control device 80 is configured to include a logic circuit such as a microcomputer or the like as a core member. In the present embodiment, the inverter control device 80 is disposed on a substrate 31 (see FIGS. 5 and 6), and is accommodated in an inverter housing 51 (see FIGS. 4 to 6) together with the inverter 3. That is, in the present embodiment, the inverter device 100 is configured to include at least the inverter 3 and the inverter control device 80. The inverter control device 80 is supplied with electric power from a low-voltage DC power supply BL having a power supply voltage of, for example, about 12 to 24 [V], much lower than that of the above-described high-voltage DC power supply BH.

For example, the inverter control device 80 performs current feedback control using a vector control method based on a target torque of the rotary electric machine MG provided as a request signal from another control device such as a vehicle ECU (Electronic Control Unit) 90 (vehicle control unit) or the like via a CAN (Controller Area Network) or the like, and thereby controls the rotary electric machine MG via the inverter 3. The electric devices (the low-voltage DC power supply BL, the vehicle ECU 90, etc.) disposed outside the case 2 (drive device case) and the inverter control device 80 are connected via an external connection terminal 33. That is, the external connection terminal 33 has a function of connecting power supply lines and communication lines. The inverter control device 80 is configured to include various functional units for the current feedback control. Each functional unit is achieved by the cooperation of hardware, such as the microcomputer, and software (program). The current feedback control is well known, and therefore the detailed description thereof is herein omitted.

The actual current flowing through the stator coil of each phase of the rotary electric machine MG is detected by a current sensor 39, and the inverter control device 80 acquires the detection result. The AC currents of the three phases are balanced, and therefore the instantaneous value is always zero (amplitude center). Accordingly, only the currents of two phases out of the three phases may be detected, and the current of the remaining one phase may be obtained through calculation. The magnetic pole position and the rotational speed of the rotor of the rotary electric machine MG at each time point are detected by a rotation sensor 38 such as a resolver, for example, and the inverter control device 80 acquires the detection result.

As described above, in the present embodiment, the vehicle drive device 1 is configured in which vehicle drive transmission devices provided on the power transmission path connecting the internal combustion engine E and the wheels W, more specifically, the clutch CL, the rotary electric machine MG, the transmission device TM, the counter gear mechanism CG, and the differential gear device DF are accommodated in the case 2 (drive device case). The expression "accommodated in the case 2" as used herein refers to "contained in a space enclosed by a case outer wall 2a of the case 2".

Figure 3:
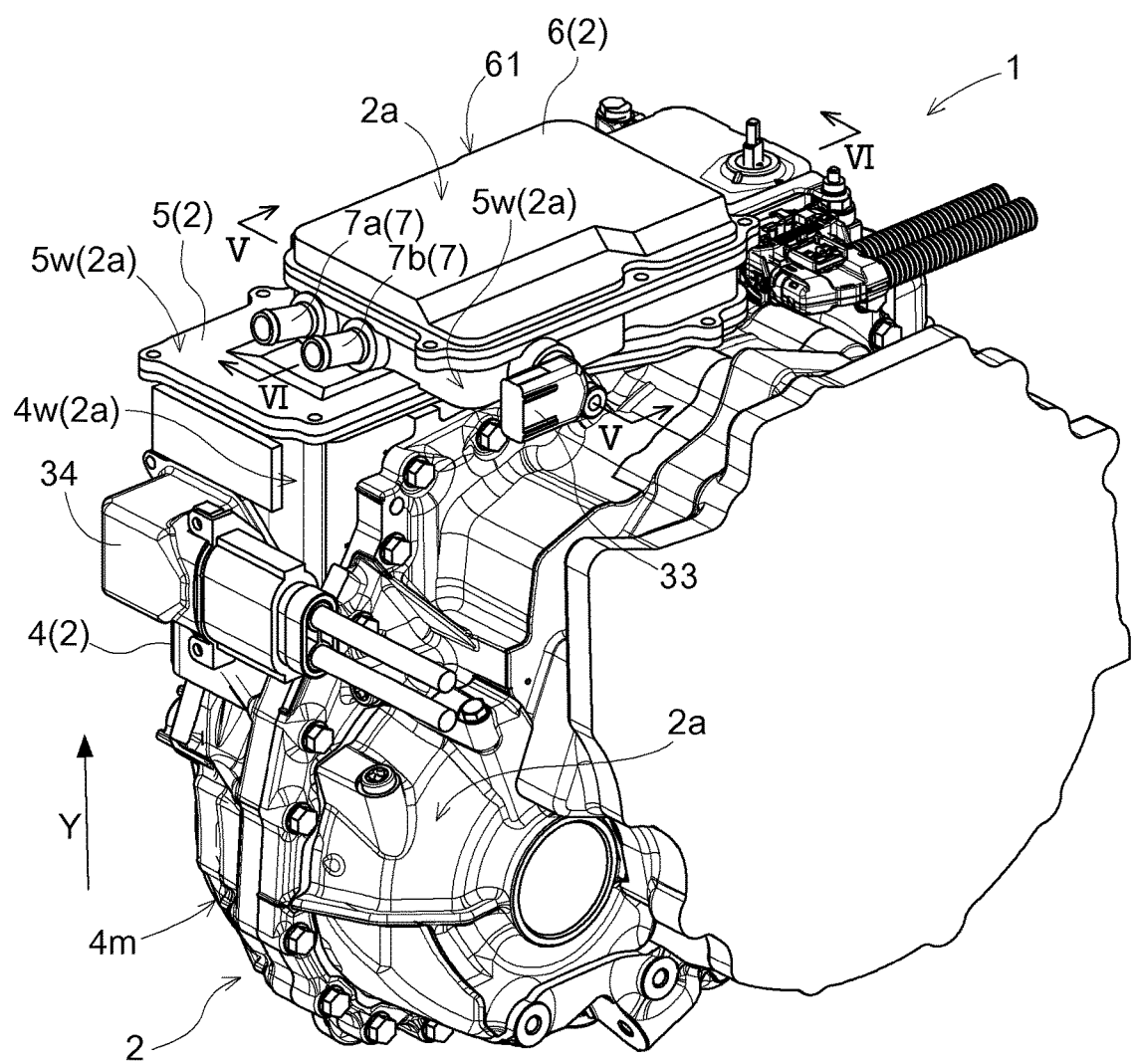
FIG. 3 is an external perspective view illustrating the vehicle drive device.
Figure 4:
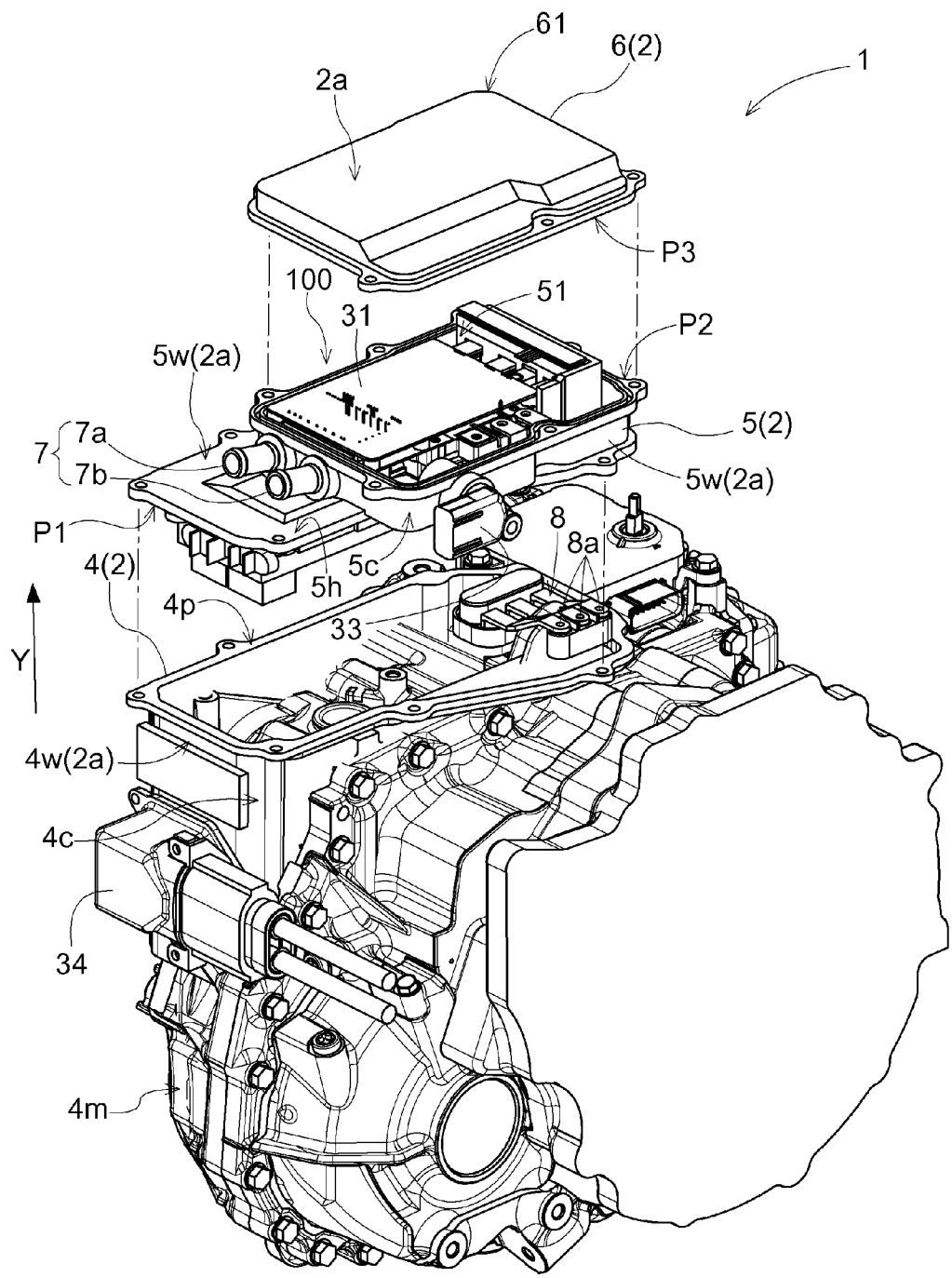
FIG. 4 is an exploded perspective view illustrating the vehicle drive device.

The perspective view of FIG. 3 illustrates the external appearance of the vehicle drive device 1. Furthermore, FIG. 4 is a partial exploded perspective view illustrating the vehicle drive device 1. As will be described below, the vehicle drive device 1 has a characteristic structure for accommodation of the inverter 3 that controls the rotary electric machine MG. Accordingly, the vehicle drive device 1 has only to contain at least the rotary electric machine MG that serves as a drive power source for the wheels W and the inverter 3 that controls the rotary electric machine MG in the space enclosed by the case outer wall 2a, and is not limited to the aspects of the present embodiment.

As illustrated in FIGS. 3 and 4, the vehicle drive device 1 of the present embodiment includes a body case 4 that accommodates at least the rotary electric machine MG, an inverter case 5 joined to the body case 4, and an inverter case cover 6 joined to the inverter case 5. That is, the case 2 (drive device case) of the vehicle drive device 1 is formed by at least the body case 4, the inverter case 5, and the inverter case cover 6. Specifically, the outermost portion of the vehicle drive device 1, that is, the case outer wall 2a as a portion exposed to the outside is formed by at least a first outer wall forming portion 4w as an outer wall forming portion (i.e., outer wall) of the body case 4, a second outer wall forming portion 5w as an outer wall forming portion (i.e., outer wall) of the inverter case 5, and the inverter case cover 6. The inverter case cover 6 is formed in the shape of a tray with a flat bottom, and the substantially the entire surface on the protruding side is an outer wall forming portion (i.e., outer wall). The protruding side of the inverter case cover 6 may be referred to as a third outer wall forming portion (i.e., outer wall). Note that the case 2 may be configured to further include another member. In that case, an outer wall forming portion (i.e., outer wall) of the other member may form a part of the case outer wall 2a.

For example, in the structure of United States Patent Application Publication No. 2014/0202279, a part (the power inverter module 30) corresponding to the inverter case 5 is completely contained by the casing (12) and the lid (36) that are joined to each other. With this configuration, if the inverter 3 needs to be replaced after the vehicle drive device 1 is assembled, or after the vehicle drive device 1 is mounted on the vehicle, for example, it is necessary to separate the casing (12) and the lid (36) to remove therefrom a part (the power inverter module 30) corresponding to the inverter (3). Meanwhile, in the vehicle drive device 1 of the present embodiment, a part (the second outer wall forming portion 5w) of the inverter case 5 forms the case outer wall 2a. Accordingly, the inverter 3 is disposed at the outermost side of the vehicle drive device 1. Therefore, the inverter 3 can be replaced by separating the inverter case 5 and the body case 4.

Figure 5:
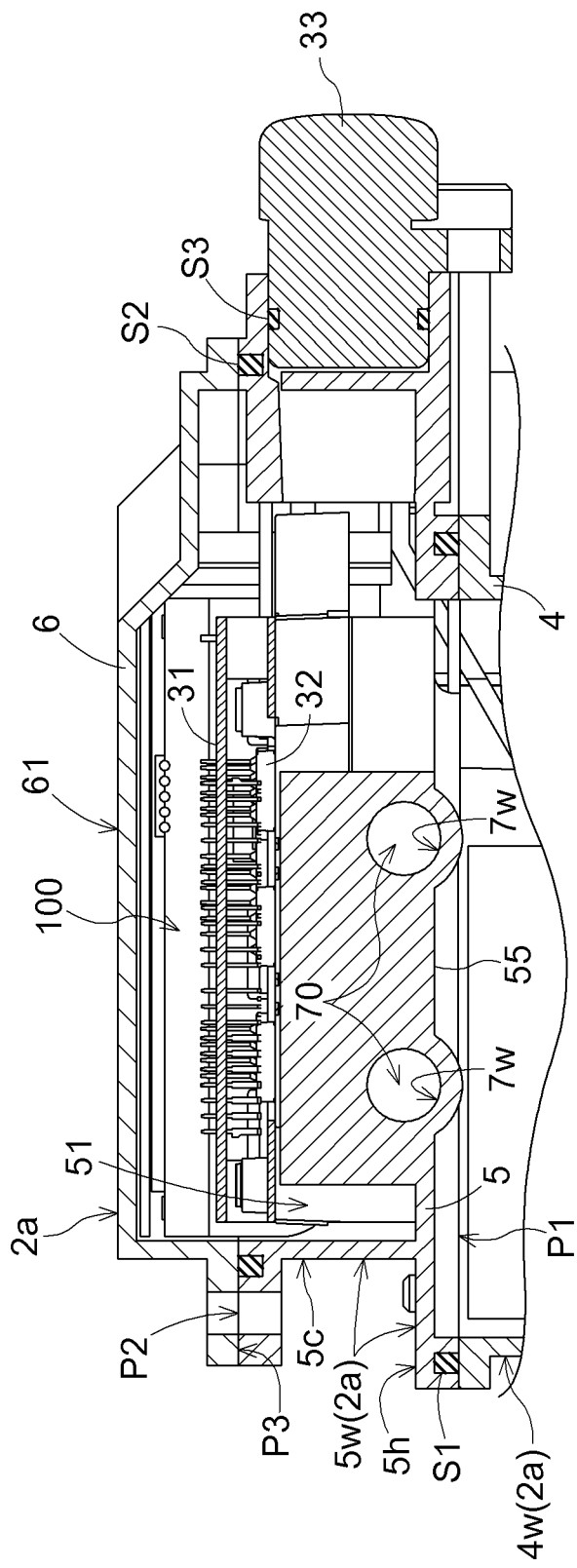
FIG. 5 is partial enlarged view illustrating a cross section taken along line V-V of FIG. 3.
Figure 6:
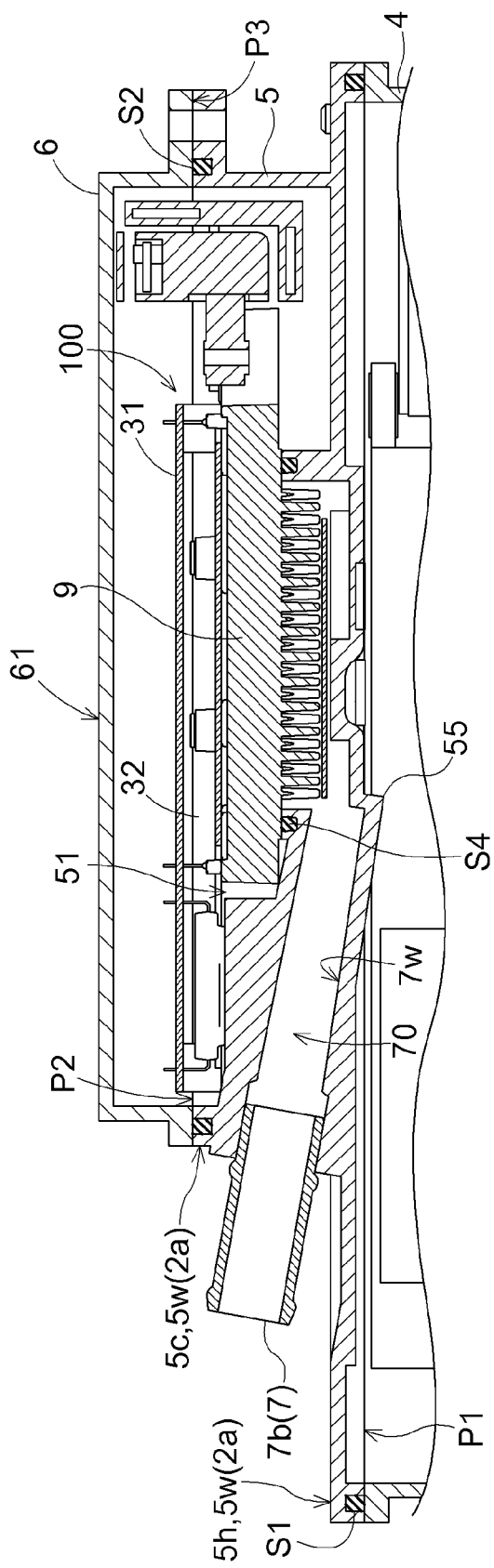
FIG. 6 is a partial enlarged view illustrating a cross section taken along line VI-VI of FIG. 3.

FIG. 5 is partial enlarged view illustrating a cross section taken along line V-V of FIG. 3. FIG. 6 is a partial enlarged view illustrating a cross section taken along line VI-VI of FIG. 3 As illustrated in FIGS. 5 and 6, the inverter housing 51 that accommodates the inverter 3 is formed in a space enclosed by at least the inverter case 5. Since electronic components are disposed in the inverter housing 51, the inverter housing 51 needs to be appropriately sealed so as to prevent cooling oil, lubricating oil, water, and other types of fluid from entering the case 2, in particular the inverter housing 51. The reference numerals S1, S2, S3, and S4 in FIGS. 5 and 6 denote sealing members that seal between the outside and inside of the case 2. The sealing members may be O-rings, X-rings, or the like made of a rubber material such as nitrile rubber, styrene rubber, silicone rubber, and fluororubber.

The first sealing member S1 is disposed between the inverter case 5 and the body case 4, and seals between the inverter housing 51 and a space under a partition wall portion 55 (i.e., partition wall) in FIGS. 5 and 6. Note that the inverter housing 51 may extend also to a region (a region not illustrated) under the partition wall portion 55 in FIGS. 5 and 6. That is, the inverter housing 51 may be divided by the partition wall portion 55, and the members forming the inverter device 100 may be disposed in the two separate spaces of the inverter housing 51. Furthermore, a housing (not illustrated) of the transmission device TM is formed thereunder, and the inverter housing 51 and the housing of the transmission device TM may be liquid-tightly isolated by a non-illustrated sealing member.

The second sealing member S2 is disposed between the inverter case 5 and the inverter case cover 6, and seals between the inverter housing 51 and the outside of the vehicle drive device 1. The third sealing member S3 is disposed between the inverter case 5 and the external connection terminal 33 described below, and seals between the inverter housing 51 and the outside of the vehicle drive device 1. The fourth sealing member S4 is disposed between the partition wall portion 55 of the inverter case 5 and a heatsink 9 described below in the inverter housing 51 in order to define a flow path of liquid refrigerant that cools the inverter 3, and seals to prevent liquid refrigerant from leaking to the inverter 3 side.

The connection terminal 8 electrically connecting the rotary electric machine MG and the inverter 3 is disposed in the inverter housing 51. In this example, the connection terminal 8 extending from the body case 4 side and connected to the inverter 3 is disposed in the inverter housing 51. The connection terminal 8 is connected to the inverter 3 in the inverter housing 51 by a fastening member 10 (i.e., fastener) (see FIG. 7) such as a bolt that extends through a fastening hole 8a provided in the connection terminal 8. Since the connection terminal 8 is disposed in the inverter housing 51, the connection terminal 8 can be exposed to the outside by removing the inverter case cover 6. Therefore, the workability upon attaching and detaching the inverter 3 to and from the vehicle drive device 1 is improved, and the maintainability of the vehicle drive device 1 is enhanced.

It is preferable that the interconnect on at least one of the body case 4 side of the connection terminal 8 and the inverter 3 side of the connection terminal 8 is configured as a so-called bus bar, and the current sensor 39 of a non-contact type that detects a current is disposed close to the bus bar. The current sensor 39 may be disposed on either of the body case 4 side of the connection terminal 8 and the inverter 3 side of the connection terminal 8. Obviously, the current sensor 39 of a contact type may be disposed midway of either of the bus bars. Furthermore, without being limited to the position illustrated in FIG. 2, a current sensor using a shunt resistor may be provided on each arm of the inverter 3.

The switching elements 30 included in the inverter 3 generate a great heat. Therefore, as illustrated in FIGS. 5 and 6, the heatsink 9 is attached to the IPM serving as a core of the inverter 3. The heatsink 9 is configured to be cooled by liquid refrigerant, and the inverter 3 is cooled by heat exchange with the liquid refrigerant via the heatsink 9. A supply port 7a and a discharge port 7b for liquid refrigerant for cooling the inverter 3 are formed on the second outer wall forming portion 5w of the inverter case 5. That is, the supply port 7a and the discharge port 7b for liquid refrigerant are provided directly on the case outer wall 2a which is a portion of the case 2 exposed to the outside. Note that although one of the refrigerant supply and discharge ports 7 is illustrated as the supply port 7a and the other one is illustrated as the discharge port 7b for the sake of convenience in FIGS. 3, 4, and 6, these functions may he switched therebetween.

The refrigerant supply and discharge ports 7 are provided on the second outer wall forming portion 5w. In other words, the refrigerant supply and discharge ports 7 are formed directly on the inverter case 5. Accordingly, locations that need to be sealed are limited. For example, according to United States Patent Application Publication No. 2014/0202279, the refrigerant flow path passes through the platform (26) of the casing to enter the housing space, and is connected to the inverter (the power inverter module 30) inside the housing space. Accordingly, since the boundary between the outside of the casing and the housing space needs to be sealed, there are more sealed locations as compared to the present embodiment.

Furthermore, as described above, the electric devices (the low-voltage DC power supply BL and the vehicle ECU 90) disposed outside the case outer wall 2a and the inverter device 100 (the inverter 3 and the inverter control device 80) are electrically connected via the external connection terminal 33. The external connection terminal 33 is also formed on the second outer wall forming portion 5w. That is, similar to the refrigerant supply and discharge ports 7, the external connection terminal 33 is provided directly on the inverter case 5. Accordingly, for example, as compared to the case where a connection terminal extends through the housing space as described in United States Patent Application Publication No. 2014/0202279, the number of locations that need to be sealed can be reduced. Furthermore, when the inverter case 5 is detached from the vehicle drive device 1, the interconnects to the electric devices disposed outside are also detached from the vehicle drive device 1 together with the inverter case 5. Accordingly, the workability upon attaching and detaching the inverter 3 to and from the vehicle drive device 1 is improved.

The body case 4 includes a tubular (square tubular) body wall portion 4m (i.e., tubular body wall) containing at least one of the vehicle drive transmission devices of the vehicle drive device 1, and a protruding peripheral wall portion 4c (i.e., protruding peripheral wall) protruding in a protruding direction Y as one of outward directions from the body wall portion 4m and formed to surround the periphery in the protruding direction Y. In the present embodiment, the transmission device TM, which is one of the vehicle drive transmission devices, is contained inside the body wall portion 4m. An end face 4p of the protruding peripheral wall portion 4c in the protruding direction Y forms a so-called flange portion. The second outer wall forming portion 5w of the inverter case 5 is joined to the flange portion. By forming such a flange portion, the body case 4 and the inverter case 5 can be appropriately joined.

As illustrated in FIGS. 3 to 5, at least a part of the second outer wall forming portion 5w of the inverter case 5 has a lid portion 5h formed to be generally parallel to a first joining face P1 that is joined to the protruding peripheral wall portion 4c. Furthermore, at least a part of the second outer wall forming portion 5w also has a wall portion (5c) (i.e., surrounding wall) protruding in the protruding direction Y from the first joining face P1 that is joined to the protruding peripheral wall portion 4c. This wall portion (5c) is formed to surround the periphery in the protruding direction Y, and is formed as a surrounding wall portion 5c that surrounds the inverter device 100 (the inverter 3 and the inverter control device 80) from the direction orthogonal to the protruding direction Y. The surrounding wall portion 5c is formed to continue from the lid portion 5h and protrude from the lid portion 5h in the protruding direction Y. In other words, the second outer wall forming portion 5w includes the surrounding wall portion 5c that is formed to surround the periphery in the protruding direction Y in an area between the first joining face P1, which is joined to the protruding peripheral wall portion 4c in the protruding direction Y, and a second joining face P2, which is joined to the inverter case cover 6, and that surrounds the inverter device 100 disposed there-inside.

With the surrounding wall portion 5c, the inverter case 5 can secure the thickness in the direction along the protruding direction Y. Therefore, it is possible to appropriately provide the inverter housing 51 with the inverter case 5 as its core. Furthermore, since the surrounding wall portion 5c is a part of the second outer wall forming portion 5w, the capacity of the inverter case 5 for accommodating the inverter device 100 can be secured without impairing the attachment and detachment properties of the inverter case 5. Furthermore, the inverter case cover 6 includes a joining face P3 that is joined to the second joining face P2, and a bulging portion 61 bulging from the joining face P3 away from the inverter case 5. The bulging portion 61 also forms the inverter housing 51, so that the capacity for accommodating the inverter device 100 can be secured.

Providing the surrounding wall portion 5c allows increasing the surface area of the case outer wall 2a of the inverter case 5, that is, the second outer wall forming portion 5w. By effectively using the increased surface area, a connection portion to the outside of the vehicle drive device 1 can be appropriately disposed. For example, the refrigerant supply and discharge ports 7 for liquid refrigerant are formed on the surrounding wall portion 5c. Accordingly, as illustrated in FIGS. 5 and 6, a refrigerant passage 70 can appropriately extend from the side of the inverter 3 in the direction toward the heatsink 9 disposed on the body case 4 side of the inverter 3 in the present embodiment. That is, it is possible to form the refrigerant passage 70 that does not prevent the flow of refrigerant and that is preferable in achieving good heat exchange.

Note that in the present embodiment, as illustrated in FIGS. 5 and 6, a part of the inner wall of the flow path for circulating liquid refrigerant, that is, the refrigerant passage 70 is formed by the inverter case 5. AS illustrated in FIGS. 5 and 6, the inverter case 5 includes the partition wall portion 55 that partitions between the body case 4 side and the inverter case cover 6 side. The partition wall portion 55 forms at least a part of an inner wall 7w of the flow path for circulating liquid refrigerant. Accordingly, it is possible to achieve an appropriate cooling structure while preventing an increase in the size of the inverter case 5.

Furthermore, at least some components of the inverter 3 are fixed to the partition wall portion 55. As illustrated in FIGS. 5 and 6, the IPM 32 serving as a core of the inverter 3 and containing the switching elements 30 is fixed in direct contact with the heatsink 9. The heatsink 9 is fixed to the partition wall portion 55. A terminal of the IPM 32 protrudes in a direction away from the heatsink 9, extends through the substrate 31, and is connected to the substrate 31 by soldering or the like. As mentioned above, the electronic components of the inverter control device 80 are also mounted on the substrate 31, and the inverter control device 80 and the IPM 32 are electrically connected on the substrate 31.

As described above, in the vehicle drive device 1 provided with the rotary electric machine MG that serves as a drive power source for the wheels W and the inverter 3 that controls the rotary electric machine MG, a structure is achieved that allows easy attaching and detaching of the inverter 3 and reduces the number of locations to be sealed.

<Other Embodiments>

Hereinafter, other embodiments of the vehicle drive device 1 will be described. The configuration disclosed in each of the following embodiments may be applied alone, or may be applied in combination with the configuration disclosed in any other embodiments as long as no inconsistency arises.

(1) In the embodiment illustrated above, the inverter housing 51 that accommodates the inverter device 100 (the inverter 3 and the inverter control device 80) is formed in the space enclosed by the inverter case 5 and the inverter case cover 6, and the inverter device 100 is disposed in the inverter housing 51. However, the inverter housing 51 may be a space enclosed by at least the inverter case 5. That is, the inverter housing 51 may be a space enclosed by the inverter case 5 and the body case 4, or may be a space enclosed by the inverter case 5, the inverter case cover 6, and the body case 4. Furthermore, as mentioned in the description of the first sealing member S1, the inverter housing 51 may be divided by the partition wall portion 55, and the members forming the inverter device 100 may be disposed in the two separate spaces of the inverter housing 51.

(2) In the embodiment described above, as illustrated in FIGS. 5 and 6, the refrigerant passage 70 extends from the side of the inverter 3 in the direction toward the heatsink 9 disposed on the body case 4 side of the inverter 3. That is, the refrigerant supply and discharge ports 7 are formed on the surrounding wall portion 5c. However, the refrigerant supply and discharge ports 7 have only to be formed on the second outer wall forming portion 5w, and are not limited to this embodiment. For example, the refrigerant supply and discharge ports 7 may be formed on the lid portion 5h.

In the above description, the electric devices disposed outside the case outer wall 2a include the low-voltage DC power supply BL and the vehicle ECU 90. However, for example, in the case where the inverter control device 80 is disposed outside the case 2, the electric devices may also include the inverter control device 80. Furthermore, the electric devices may include the high-voltage DC power supply BH. Furthermore, in the embodiment described with reference to FIGS. 3 to 6, an external connection terminal 34 connected to the high-voltage DC supply BH is formed on the first outer wall forming portion 4w. However, the external connection terminal 34 may be formed on the second outer wall forming portion 5w.

<Summary of Preferred Embodiments>

The following provides a brief summary of the preferred embodiments of the vehicle drive device (1) described above.

In one aspect, a vehicle drive device (1) contains a rotary electric machine (MG) that serves as a drive power source for wheels (W) and an inverter device (100) that controls the rotary electric machine (MG) in a space enclosed by a case outer wall (2a), the vehicle drive device (1) including:
 a body case (4) that accommodates at least the rotary electric machine (MG);
 an inverter case (5) joined to the body case (4); and
 an inverter case cover (6) joined to the inverter case (5);
 wherein an inverter housing (51) that accommodates the inverter device (100) is formed in a space enclosed by at least the inverter case (5);
 wherein a connection terminal (8) electrically connecting the rotary electric machine (MG) and the inverter device (100) is disposed in the inverter housing (51);
 wherein the case outer wall (2a) is formed by at east a first outer wall forming portion (4w), a second outer wall forming portion (5w), and the inverter case cover (6), the first outer wall forming portion (4w) being an outer wall forming portion of the body case (4), the second outer wall forming portion (5w) being an outer wall forming portion of the inverter case (5); and
 a supply port (7a) and a discharge port (7b) for liquid refrigerant for cooling the inverter device (100) are formed on the second outer wall forming portion (5w).

According to the present configuration, the supply port (7a) and the discharge port (7b) for liquid refrigerant are provided in the second outer wall forming portion (5w). In other words, the supply port (7a) and the discharge port (7b) are formed directly on the inverter case (5) that accommodates the inverter device (100) to be cooled. Accordingly, locations that need to be sealed are limited. For example, according to United States Patent Application Publication No. 2014/0202279, the refrigerant flow path passes through the platform (26) of the casing to enter the housing space, and is connected to the inverter device (100) inside the housing space. Accordingly, since the boundary between the outside of the casing and the housing space needs to be sealed, there are more sealed locations as compared to the present configuration. Thus, according to the present configuration, it is possible to achieve, in the vehicle drive device (1) provided with the rotary electric machine (MG) that serves as a drive power source for the wheels (W) and the inverter device (100) that controls the rotary electric machine (MG), a structure that allows easy maintenance of the inverter device (100) and reduces the number of locations to be sealed.

The outermost portion of the vehicle drive device (1), that is, the case outer wall (2a) is formed by the first outer wall forming portion (4w), the second outer wall forming portion (5w), and the inverter case cover (6). For example, in the structure of United States Patent Application Publication No. 2014/0202279, a part (the power inverter module 30) corresponding to the inverter case (5) is completely contained by the casing (12) and the lid (36) that are joined to each other. Accordingly, with the configuration of United States Patent Application Publication No. 2014/0202279, if the inverter device (100) needs to be replaced after the vehicle drive device (1) is assembled, or after the vehicle drive device (1) is mounted on the vehicle, for example, it is necessary to separate the casing, (12) and the lid (36) to remove therefrom a part (the power inverter module 30) corresponding to the inverter device (100). Meanwhile, according to the present configuration, a part (the second outer wall forming portion (5w)) of the inverter case (5) forms the case outer wall (2a), and the inverter device (100) is disposed at the outermost side of the vehicle drive device (1). Therefore, the inverter device (100) can be replaced by separating the inverter case (5) and the body case (4). Furthermore, since the connection terminal (8) electrically connecting the rotary electric machine (MG) and the inverter device (100) is disposed in the inverter housing (51), the workability upon attaching and detaching the inverter device (100) to and from the vehicle drive device (1) is improved. That is, according to the present configuration, the maintainability of the vehicle drive device (1) is enhanced.

Furthermore, it is preferable that the connection terminal (8) extends from a body case (4) side and is connected to the inverter device (100) in the inverter housing (51) by a fastening, member (10). Since the connection terminal (8) is disposed in the inverter housing (51), the connection terminal (8) can be exposed to the outside by removing the inverter case cover (6). Therefore, the workability upon attaching and detaching the inverter device (100) to and from the vehicle drive device (1) is improved, and the maintainability of the vehicle drive device (1) is enhanced.

It is preferable that in the vehicle drive device (1), an external connection terminal (33) for electrically connecting the inverter device (100) and an electric device (BL, 90) disposed outside the case outer wall (2a) is further formed on the second outer wall forming portion (5w). Similar to the refrigerant supply and discharge ports (7) described above, the external connection terminal (33) is provided directly on the inverter case (5). Accordingly, for example, as compared to the case where a connection terminal extends through the housing space as described in United States Patent Application Publication No. 2014/0202279, the number of locations that need to be sealed can be reduced. Furthermore, when the inverter case (5) is detached from the vehicle drive device (1), the interconnect to the electric device (BL, 90) disposed outside is also detached from the vehicle drive device (1) together with the inverter case (5). Accordingly, the workability upon attaching and detaching the inverter device (100) to and from the vehicle drive device (1) is improved.

In the vehicle drive device (1), it is preferable that: the body case (4) include a tubular body wall portion (4m) and a protruding peripheral wall portion (4c) protruding in a protruding direction (Y) as one of outward directions from the body wall portion (4m) and formed to surround a periphery in the protruding direction (Y); and the second outer wall forming portion (5w) be joined to an end face (4p) of the protruding peripheral wall portion (4c) in the protruding direction (Y). With this configuration, since the protruding peripheral wall portion (4c) forms a so-called flange portion, the body case (4) and the inverter case (5) can be appropriately joined.

It is preferable that: the second outer wall forming portion include a surrounding wall portion (5c) that is formed to surround a periphery in the protruding direction (Y) in an area between a first joining face (P1) and a second joining face (P2); and surround the inverter device (100) disposed thereinside, the first joining face (P1) being joined to the protruding peripheral wall portion (4c) in the protruding direction (Y), the second joining face (P2) being joined to the inverter case cover (6). With the surrounding wall portion (5c), the thickness in the direction along the protruding direction (Y) can be secured, so that the inverter housing (51) can be provided appropriately. Furthermore, since the surrounding wall portion (5c) is a part of the second outer wall forming portion (5w), the capacity of the inverter case (5) for accommodating the inverter device (100) can be secured without impairing the attachment and detachment properties of the inverter case (5).

With the provision of the surrounding wall portion (5c), the surface area of the case outer wall (2a) of the inverter case 5, that is, the second outer wall forming portion (5w) can be increased. Furthermore, by effectively using the increased surface area, a connection portion to the outside of the vehicle drive device (1) can be appropriately disposed. In one aspect, it is preferable that the supply port (7a) and the discharge port (7b) for the liquid refrigerant be formed on the surrounding wall portion (5c).

Furthermore, it is preferable that: the inverter case (5) include a partition wall portion (55) that partitions between a body case (4) side and an inverter case cover (6) side; the partition wall portion (55) form at least a part of an inner wall (7w) of a flow path (70) for circulating the liquid refrigerant; and at least some components of the inverter device (100) be fixed to the partition wall portion (55). The liquid refrigerant is directly supplied and discharged between the outside of the vehicle drive device (1) and the inverter case (5), and the flow path (70) for circulating the liquid refrigerant is formed on the inverter case (5) itself. Therefore, the cooling structure can be simplified. Furthermore, the number of locations that need to be sealed is reduced.

The invention claimed is:

1. A vehicle drive device containing a rotary electric machine that serves as a drive power source for wheels and an inverter device that controls the rotary electric machine in a space enclosed by a case outer wall, the vehicle drive device comprising:
   a body case that accommodates at least the rotary electric machine;
   an inverter case joined to the body case; and
   an inverter case cover joined to the inverter case;
   wherein an inverter housing that accommodates the inverter device is formed in a space enclosed by at least the inverter case;
   wherein a connection terminal electrically connecting the rotary electric machine and the inverter device is disposed in the inverter housing;
   wherein the case outer wall is formed by a first outer wall, a second outer wall, and the inverter case cover, the first outer wall being an outer wall of the body case, the second outer wall being an outer wall of the inverter case; and
   wherein a supply port and a discharge port for liquid refrigerant for cooling the inverter device are formed on the second outer wall.

2. The vehicle drive device according to claim 1, wherein the connection terminal extends from a body case side and is connected to the inverter device in the inverter housing by a fastener.

3. The vehicle drive device according to claim 1, wherein an external connection terminal for electrically connecting the inverter device and an electric device disposed outside the case outer wall is further formed on the second outer wall.

4. The vehicle drive device according to claim 1, wherein the body case includes a tubular body wall and a protruding peripheral wall protruding in a protruding direction as one of outward directions from the body wall and formed to surround a periphery in the protruding direction; and wherein the second outer wall is joined to an end face of the protruding peripheral wall in the protruding direction.

5. The vehicle drive device according to claim 4, wherein the second outer wall includes a surrounding wall that is formed to surround a periphery in the protruding direction in an area between a first joining face and a second joining face, and that surrounds the inverter device disposed thereinside, the first joining face being joined to the protruding peripheral wall in the protruding direction, the second joining face being joined to the inverter case cover.

6. The vehicle drive device according to claim 5, wherein the supply port and the discharge port for the liquid refrigerant are formed on the surrounding wall.

7. The vehicle drive device according to claim 1,
   wherein the inverter case includes a partition wall that partitions between a body case side and an inverter case cover side;
   wherein the partition wall forms at least a part of an inner wall of a flow path for circulating the liquid refrigerant; and
   wherein at least some components of the inverter device are fixed to the partition wall.

8. The vehicle drive device according to claim 2, wherein an external connection terminal for electrically connecting the inverter device and an electric device disposed outside the case outer wall is further formed on the second outer wall.

9. The vehicle drive device according to claim 8, wherein the body case includes a tubular body wall and a protruding peripheral wall protruding in a protruding direction as one of outward directions from the body wall and formed to surround a periphery in the protruding direction; and wherein the second outer wall is joined to an end face of the protruding peripheral wall in the protruding direction.

10. The vehicle drive device according to claim 9, wherein the second outer wall includes a surrounding wall that is formed to surround a periphery in the protruding direction in an area between a first joining face and a second joining face, and that surrounds the inverter device disposed thereinside, the first joining face being joined to the protruding peripheral wall in the protruding direction, the second joining face being joined to the inverter case cover.

11. The vehicle drive device according to claim 10, wherein the supply port and the discharge port for the liquid refrigerant are formed on the surrounding wall.

12. The vehicle drive device according to claim 11,
   wherein the inverter case includes a partition wall that partitions between a body case side and an inverter case cover side;
   wherein the partition wall forms at least a part of an inner wall of a flow path for circulating the liquid refrigerant; and wherein at least some components of the inverter device are fixed to the partition wall.

13. The vehicle drive device according to claim 2, wherein the body case includes a tubular body wall and a protruding peripheral wall protruding in a protruding direction as one of outward directions from the body wall and formed to surround a periphery in the protruding direction; and wherein the second outer wall is joined to an end face of the protruding peripheral wall in the protruding direction.

14. The vehicle drive device according to claim 13, wherein the second outer wall includes a surrounding wall that is formed to surround a periphery in the protruding direction in an area between a first joining face and a second joining face, and that surrounds the inverter device disposed thereinside, the first joining face being joined to the protruding peripheral wall in the protruding direction, the second joining face being joined to the inverter case cover.

15. The vehicle drive device according to claim 14, wherein the supply port and the discharge port for the liquid refrigerant are formed on the surrounding wall.

16. The vehicle drive device according to claim 15,
    wherein the inverter case includes a partition wall that partitions between a body case side and an inverter case cover side;
    wherein the partition wall forms at least a part of an inner wall of a flow path for circulating the liquid refrigerant; and
    wherein at least some components of the inverter device are fixed to the partition wall.

17. The vehicle drive device according to claim 3, wherein the body case includes a tubular body wall and a protruding peripheral wall protruding in a protruding direction as one of outward directions from the body wall and formed to surround a periphery in the protruding direction; and wherein the second outer wall is joined to an end face of the protruding peripheral wall in the protruding direction.

18. The vehicle drive device according to claim 17, wherein the second outer wall includes a surrounding wall that is formed to surround a periphery in the protruding direction in an area between a first joining face and a second joining face, and that surrounds the inverter device disposed thereinside, the first joining face being joined to the protruding peripheral wall in the protruding direction, the second joining face being joined to the inverter case cover.

19. The vehicle drive device according to claim 18, wherein the supply port and the discharge port for the liquid refrigerant are formed on the surrounding wall.

20. The vehicle drive device according to claim 19,
    wherein the inverter case includes a partition wall that partitions between a body case side and an inverter case cover side;
    wherein the partition wall forms at least a part of an inner wall of a flow path for circulating the liquid refrigerant; and
    wherein at least some components of the inverter device are fixed to the partition wall.

* * * * *